(12) United States Patent
Batsos et al.

(10) Patent No.: US 12,210,595 B2
(45) Date of Patent: Jan. 28, 2025

(54) SYSTEMS AND METHODS FOR PROVIDING AND USING CONFIDENCE ESTIMATIONS FOR SEMANTIC LABELING

(71) Applicant: FORD GLOBAL TECHNOLOGIES, LLC, Dearborn, MI (US)

(72) Inventors: Konstantinos Batsos, Campbell, CA (US); Yong-Dian Jian, Campbell, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 393 days.

(21) Appl. No.: 17/465,915

(22) Filed: Sep. 3, 2021

(65) Prior Publication Data
US 2023/0072966 A1 Mar. 9, 2023

(51) Int. Cl.
G06F 16/00 (2019.01)
G06F 16/58 (2019.01)
G06F 17/16 (2006.01)
G06F 18/243 (2023.01)
G06N 5/04 (2023.01)
G06N 20/20 (2019.01)

(52) U.S. Cl.
CPC ........ *G06F 18/243* (2023.01); *G06F 16/5866* (2019.01); *G06F 17/16* (2013.01); *G06F 18/24323* (2023.01); *G06N 5/04* (2013.01); *G06N 20/20* (2019.01)

(58) Field of Classification Search
None
See application file for complete search history.

(56) References Cited

U.S. PATENT DOCUMENTS

| | | | |
|---|---|---|---|
| 10,921,817 B1 | 2/2021 | Kangaspunta | |
| 11,392,736 B2 * | 7/2022 | Austern | G06N 20/00 |
| 2019/0258878 A1 | 8/2019 | Koivisto et al. | |
| 2021/0073449 A1 * | 3/2021 | Segev | G06F 30/27 |
| 2021/0101624 A1 | 4/2021 | Philbin et al. | |

OTHER PUBLICATIONS

Sun et al., "Proximity based automatic data annotation for antonomous driving", IEEE/CAA Journal of Automatica Sinica (Mar. 1, 2020), 7(2): 395-404.

(Continued)

*Primary Examiner* — Tuankhanh D Phan
(74) *Attorney, Agent, or Firm* — Frank A. MacKenzie; Brooks Kushman P.C.

(57) ABSTRACT

Systems and methods for processing and using sensor data. The methods comprise: obtaining semantic labels assigned to data points; performing a supervised machine learning algorithm and an unsupervised machine learning algorithm to respectively generate a first confidence score and a second confidence score for each semantic label of said semantic labels, the first and second confidence scores each representing a degree of confidence that the semantic label is correctly assigned to a respective one of the data points; generating a final confidence score for each said semantic label based on the first and second confidence scores; selecting subsets of the data points based on the final confidence scores; and aggregating the data points of the subsets to produce an aggregate set of data points.

20 Claims, 10 Drawing Sheets

(56) References Cited

OTHER PUBLICATIONS

Gupta, A. et al., Tree Annotations in LiDAR Data Using Point Densities and Convolutional Neural Networks, IEEE Transactions on Geoscience and Remote Sensing, 2019, available at https://doi.org/10.1109/TGRS.2019.2942201.

Amazon Web Services, Inc., Automate Data Labeling, Amazon SageMaker, 2021, available at sagemaker-dg.pdf#sms-automated-labeling.

* cited by examiner

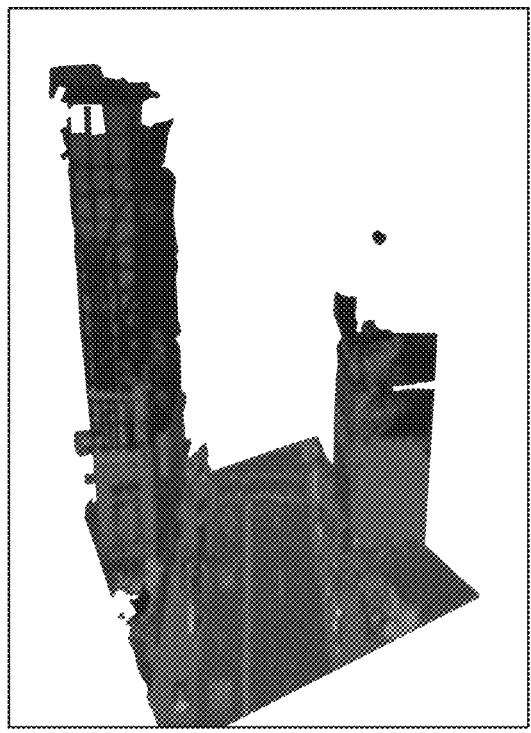 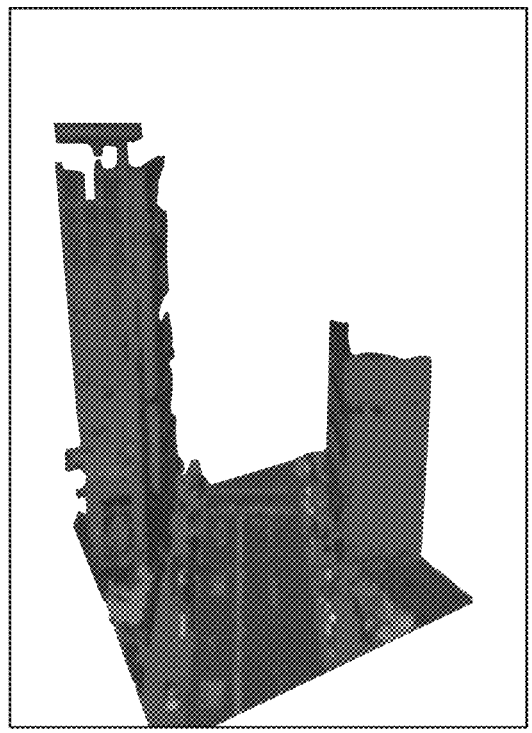
FIG. 9
PRIOR ART
FIG. 10

SYSTEMS AND METHODS FOR PROVIDING AND USING CONFIDENCE ESTIMATIONS FOR SEMANTIC LABELING

BACKGROUND

Statement of the Technical Field

The present disclosure relates generally to sensor systems. More particularly, the present disclosure relates to implementing systems and methods for providing and using confidence estimations for semantic labeling.

Description of the Related Art

Modern day vehicles have at least one on-board computer and have internet/satellite connectivity. The software running on these on-board computers monitor and/or control operations of the vehicles. The vehicle also comprises LiDAR detectors for detecting objects in proximity thereto. The LiDAR detectors generate LiDAR datasets that measure the distance from the vehicle to an object at a plurality of different times. These distance measurements can be used for tracking movements of the object, making predictions as to the object's trajectory, and planning paths of travel for the vehicle based on the predicted objects trajectory.

SUMMARY

The present disclosure concerns implementing systems and methods for processing and using sensor data. The methods comprising: obtaining, by the computing device, semantic labels assigned to data points of the sensor data; performing, by the computing device, a supervised machine learning algorithm and an unsupervised machine learning algorithm to respectively generate a first confidence score and a second confidence score for each semantic label of said semantic labels, each of the first and second confidence scores representing a degree of confidence that the semantic label is correctly assigned to a respective one of the data points; generating, by the computing device, a final confidence score for each said semantic label based on the first and second confidence scores; selecting, by the computing device, subsets of the data points based on the final confidence scores; aggregating, by the computing device, the data points of the subsets to produce an aggregate set of data points; and/or using the aggregated data set to facilitate control of operations of a robotic system (e.g., an autonomous vehicle or articulating arm) (e.g., use the aggregated data set in an object detection process to detect an object in proximity of a robotic system, and to use results of the object detection process to control operations of the robotic system).

The first and second confidence scores may be determined using at least one of the following features: normal of data points; relative locations of data points in 3D space; distances between data points in 3D space; an angle of a data point projected onto a 2D image relative to a given surface captured in the 2D image; a density of data points in proximity to a boundary of an object; a probability of a current semantic label assignment for each data point, a ratio of a second best semantic label assignment of a neural network for each data point to a first best semantic label assignment of the neural network for each data point; a distance from a data point to a projection plane; a measure of how fronto-parallel a captured surface is to a sensor; an angular confidence value; and a conditional probability that a data point should be assigned a specific semantic label conditioned on a probability that a patch of data points to which the data point belongs is or is not a boundary patch.

The supervised machine learning algorithm may comprise a random forest classifier configured to determine a best semantic label prediction for each said data point and use the best semantic label prediction to generate the first confidence score for the semantic label assigned to said data point. The first confidence score can have a high confidence value when the semantic label assigned to said data point matches the best semantic label prediction, and a low confidence value when the semantic label assigned to said data point does not match the best semantic label prediction.

The unsupervised machine learning algorithm may (i) perform a principal component analysis to identify the most significant eigenvector of the feature vector and (ii) set the second confidence score equal to the projection of the feature vector on the first principle component identified by the eigenvalues.

The final confidence score can comprise an F-score of the first and second confidence values. The subsets may comprise data points with the F-score equal to or greater than a pre-defined threshold value. One or more of the semantic labels may be modified based on the final confidence scores to optimize global semantic label assignments within the aggregate set of data points.

The implementing systems can comprise: a processor; and a non-transitory computer-readable storage medium comprising programming instructions that are configured to cause the processor to implement a method for processing and using sensor data.

BRIEF DESCRIPTION OF THE DRAWINGS

The present solution will be described with reference to the following drawing figures, in which like numerals represent like items throughout the figures.

FIGS. 9 and 10 each provide an image showing an output from a semantic labeling process.

DETAILED DESCRIPTION

Figure 1:
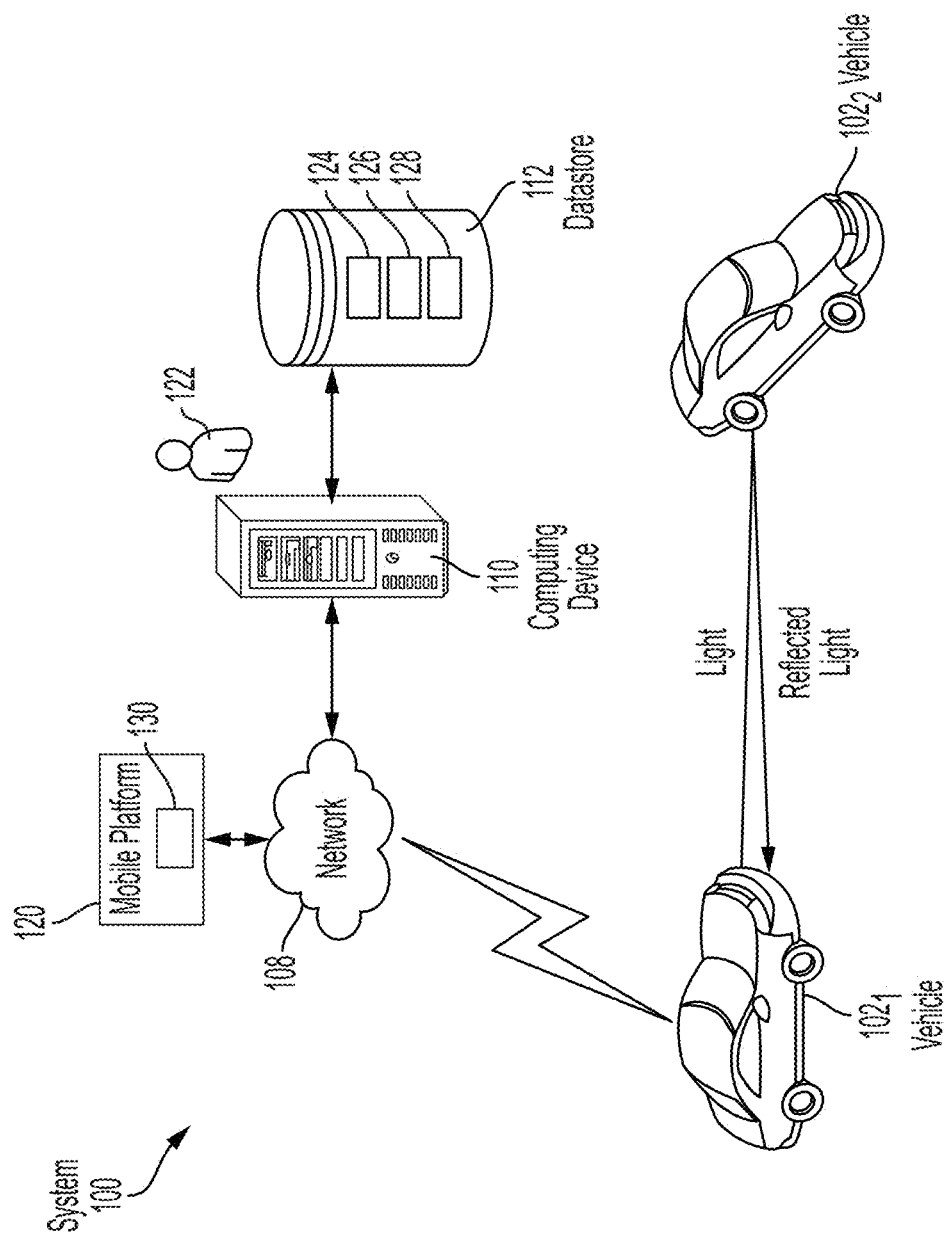
FIG. 1 is an illustration of a system.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

The terms "supervised machine learning model" and "supervised machine learning algorithm" refer to a machine learning task that maps an input to an output as trained via input-output pairs of training examples. Each input-output pair may comprise labeled data. The terms "unsupervised machine learning model" and "unsupervised machine learning algorithm" refer to a machine learning task that learns patterns from unlabeled data.

Machine learning models and/or algorithms can be used in various applications. The machine learning models/algorithms can include, but are not limited to, Convolutional Neural Networks (CNNs) and/or Recurrent Neural Networks (RNNs). For example, machine learning models/algorithms can be employed in LiDAR based machine learning systems. Such LiDAR based machine learning systems can be implemented in robotic systems (e.g., control systems for autonomous vehicles and articulating arms). The robotic systems may use the machine learning models/algorithms to facilitate (i) semantic label predictions for LiDAR point clouds and (ii) the generation of a 3D representation of a scene over multiple LiDAR sweeps.

Accurate semantic label predictions for LiDAR point clouds remain an open problem and oftentimes depends on the detail of the underlining ontology. The present solution proposes the use of machine learning to compute a confidence measure to evaluate the per LiDAR data point semantic label assignments. The confidence measure allows the system to weigh contributions of more reliable labeled data points more than unreliable labeled data points in downstream tasks, this enabling better reasoning of the real world environment.

By utilizing the confidence measure which is able to assign high values to correctly labeled data points and low values to incorrectly labeled data points, a subset of LiDAR data points can be selected to provide a more accurate data set for downstream tasks that are sensitive to outliers.

In the present solution, the confidence measure is generated using a supervised machine learning model/algorithm and an unsupervised machine learning model/algorithm. The supervised machine learning model/algorithm is trained to generate a first confidence score representing a level of confidence that a semantic label assigned to each data point of 3D LiDAR point cloud(s) is accurate and/or correct. The semantic label can include, but is not limited to, no data, unlabeled, road, sidewalk, building, fence, vegetation, terrain, vehicle, person, animal, and/or sign. An unsupervised machine learning model/algorithm is employed to generate a second confidence score also representing a level of confidence that a semantic label assigned to each data point of the 3D LiDAR point cloud(s) is accurate and/or correct. The first and second confidence scores are then combined together to generate a final confidence score for each data point in the 3D LiDAR point cloud(s). The duality of the confidence measure allows the system to use data that is not available during ground truth estimation and to continuously refine the confidence measure as new data becomes available.

The final confidence scores are used to select a subset of data points from each LiDAR point cloud. The data points in the subsets are fused or aggregated into a single 3D graph that provides a dense 3D representation of a scene over multiple LiDAR sweeps. The 3D representation of the scene may then be used for object detection, object trajectory predications, and/or mobile platform path planning.

The present solution will be described below in the context of an autonomous vehicle application. The present solution is not limited to autonomous vehicle applications. The present solution can be used in other applications such as other robotic applications (e.g., to control an articulating arm).

Illustrative Systems

Referring now to FIG. 1, there is provided an illustration of an illustrative system 100 implementing the present solution. System 100 comprises a mobile platform 120 communicatively coupled to a computing device 110 via a network 108 (e.g., the Internet and/or cellular network). The mobile platform 120 is configured to generate sensor data 124. The mobile platform can include, but is not limited to, a land vehicle (as shown in FIG. 1), an aircraft, a watercraft, a subterrene, or a spacecraft. The sensor data 124 can include, but is not limited to, images and/or LiDAR datasets. The sensor data 124 is communicated from the mobile platform 120 to the computing device 110 for processing and/or storage in datastore 112.

A user 122 of the computing device 110 can perform user-software interactions to access the sensor data 124 and use the sensor data to generate training data sets 126 for supervised machine learning model(s)/algorithm(s) 128. The supervised machine learning model(s)/algorithm(s) can include, but are not limited to, CNN(s) and/or RNN(s). Each training data set 126 comprises a collection of training examples $(x_0, y_0), (x_1, y_1), \ldots, (x_n, y_n)$ for training a supervised machine learning model/algorithm $f_\theta(x)$, where each component $x_0, x_1, \ldots, x_n$ represents sensor data (LiDAR data) comprising a collection of labeled data points $d_1, d_2, \ldots, d_r$ (e.g., 3D data points $p_1, p_2, \ldots, p_r$ with assigned semantic labels $l_1, l_2, \ldots, l_r$) and each component $y_0, y_1, \ldots, y_n$ represents a label or ground truth for each labeled data point. n and r are integers. The terms "label" and "ground truth" as used here both refer to a true value for a property to be predicted (e.g., a type of object (such as a cyclist), a 3D size of an object (e.g., a predicted cuboid) or a position of the object in an image) by the supervised machine learning model(s)/algorithm(s). The training process generally involves using the training examples to train supervised machine learning model(s)/algorithm(s) (e.g., a random forest classifier) to generate a confidence value representing a level of confidence that the semantic label $l_1, l_2, \ldots, l_r$ assigned to each data point $p_1, p_2, \ldots, p_r$ in the sensor data is accurate and/or correct.

The user 122 can manually define the labels or ground truth values $y_i$ for each training example $x_i$. The training data set 126 is then stored in datastore 112 (e.g., a database) and/or used by the computing device 110 during a training process to train the supervised machine learning model(s)/algorithm(s) 128 to, for example, facilitate scene perception by another mobile platform (e.g., vehicle 102₁). The scene perception can be achieved via feature extraction using multi-camera views, object detection using the extracted features and/or object prediction (e.g., predicted cuboids and associations of predicted cuboids with detected objects). The training process will be described in detail below.

Once trained, the supervised machine learning model(s)/algorithm(s) 128 is(are) deployed on the other mobile platforms such as vehicle 102₁. Vehicle 102₁ can travel along a road in a semi-autonomous or autonomous manner. Vehicle 102₁ is also referred to herein as an Autonomous Vehicle (AV). The AV 102₁ can include, but is not limited to, a land vehicle (as shown in FIG. 1), an aircraft, a watercraft, a subterrene, or a spacecraft. AV 102₁ is generally configured to use the trained supervised machine learning model(s)/algorithm(s) 128 to facilitate scene perception and to facilitate detection of objects in proximity thereto. The objects can include, but are not limited to, a vehicle 102₂, a cyclist (not shown) (such as a rider of a bicycle, electric scooter, motorcycle, or the like) and/or a pedestrian (not shown).

When scene perception is made, AV 102₁ performs operations to: generate one or more possible object trajectories for the detected object; and analyze at least one of the generated possible object trajectories to determine whether or not there is at least a threshold possibility or likelihood that a collision will occur between the AV and object if the AV is to follow a given trajectory. If not, the AV 102₁ is caused to follow the given platform trajectory. If so, the AV 102₁ is caused to (i) follow another platform trajectory with a relatively low probability of collision with the object or (ii) perform a maneuver to reduce the probability of collision with the object or avoid collision with the object (e.g., brakes and/or changes direction of travel).

Figure 2:
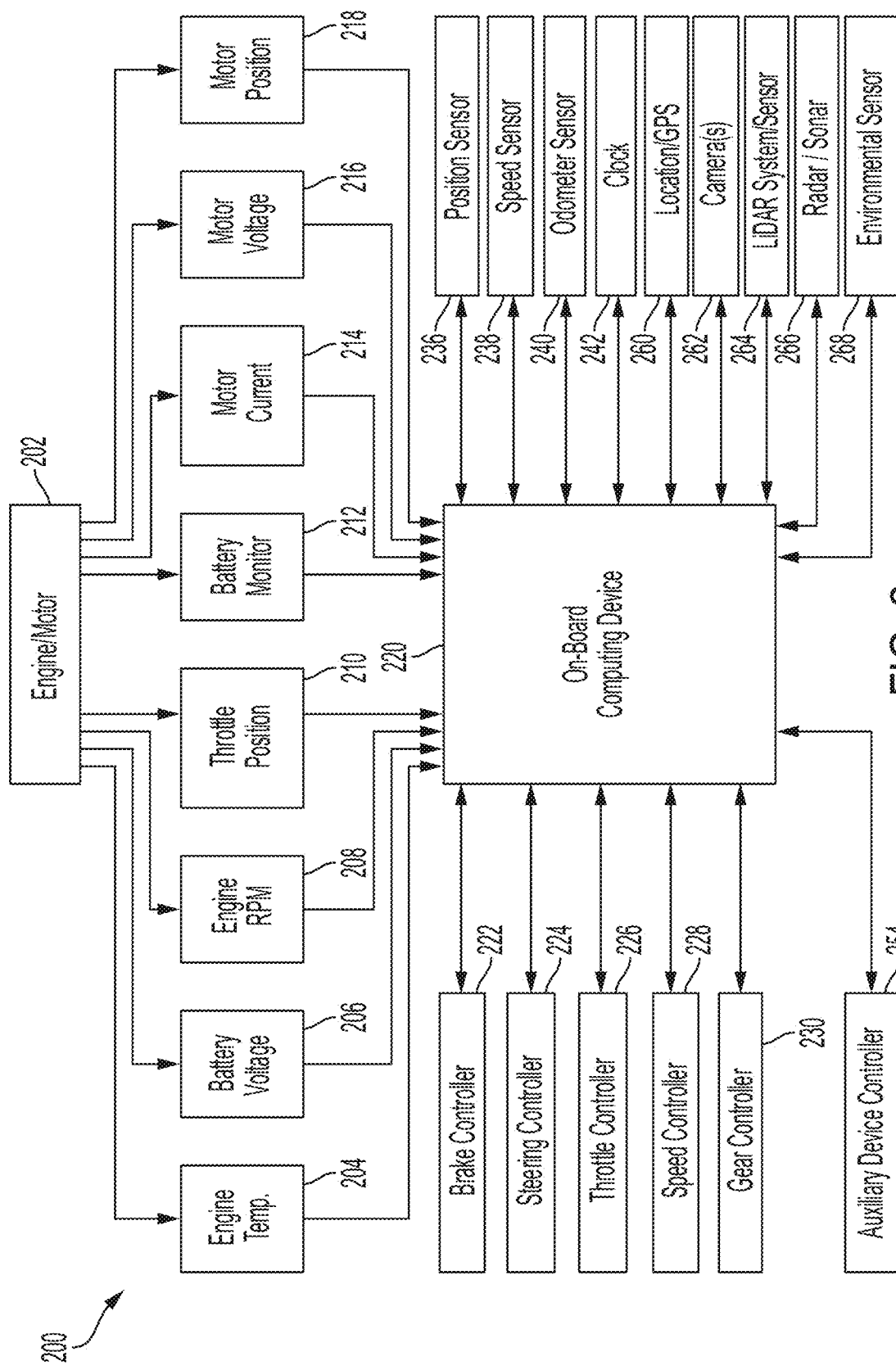
FIG. 2 is an illustration of an architecture for a mobile platform.

Referring now to FIG. 2, there is provided an illustration of an illustrative system architecture for a mobile platform 200. Mobile platforms 102₁, 102₂ and/or 120 of FIG. 1 can have the same or similar system architecture as that shown in FIG. 2. Thus, the following discussion of mobile platform 200 is sufficient for understanding mobile platform (s) 102₁, 102₂, 120 of FIG. 1.

As shown in FIG. 2, the mobile platform 200 includes an engine or motor 202 and various sensors 204-218 for measuring various parameters of the mobile platform. In gas-powered or hybrid mobile platforms having a fuel-powered engine, the sensors may include, for example, an engine temperature sensor 204, a battery voltage sensor 206, an engine Rotations Per Minute (RPM) sensor 208, and a throttle position sensor 210. If the mobile platform is an electric or hybrid mobile platform, then the mobile platform may have an electric motor, and accordingly will have sensors such as a battery monitoring system 212 (to measure current, voltage and/or temperature of the battery), motor current 214 and motor voltage 216 sensors, and motor position sensors such as resolvers and encoders 218.

Operational parameter sensors that are common to both types of mobile platforms include, for example: a position sensor 236 such as an accelerometer, gyroscope and/or inertial measurement unit; a speed sensor 238; and an odometer sensor 240. The mobile platform also may have a clock 242 that the system uses to determine mobile platform time during operation. The clock 242 may be encoded into an on-board computing device, it may be a separate device, or multiple clocks may be available.

The mobile platform also will include various sensors that operate to gather information about the environment in which the mobile platform is traveling. These sensors may include, for example: a location sensor 260 (e.g., a Global Positioning System (GPS) device); and image-based perception sensors such as one or more cameras 262. The sensors also may include environmental sensors 268 such as a precipitation sensor and/or ambient temperature sensor. The image-based perception sensors may enable the mobile platform to detect objects that are within a given distance range of the mobile platform 200 in any direction, while the environmental sensors collect data about environmental conditions within the mobile platform's area of travel.

During operations, information is communicated from the sensors to the on-board computing device 220. The on-board computing device 220 can (i) cause the sensor information to be communicated from the mobile platform to an external device (e.g., computing device 110 of FIG. 1) and/or (ii) use the sensor information to control operations of the mobile platform. For example, the on-board computing device 220 may control: braking via a brake controller 232; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers.

Geographic location information may be communicated from the location sensor 260 to the on-board computing device 220, which may then access a map of the environment that corresponds to the location information to determine known fixed features of the environment such as streets, buildings, stop signs and/or stop/go signals.

In some scenarios, the on-board computing device 220 detect a moving object and perform operations when such detection is made. For example, the on-board computing device 220 may generate one or more possible object trajectories for the detected object, and analyze the possible object trajectories to assess the probability of a collision between the object and the mobile platform if the mobile platform was to follow a given platform trajectory. If the probability does not exceed the acceptable threshold, then the on-board computing device 220 may cause the mobile platform 200 to follow the given platform trajectory. If the probability exceeds an acceptable threshold, the on-board computing device 220 performs operations to: (i) determine an alternative platform trajectory and analyze whether the collision can be avoided if the mobile platform follows this alternative platform trajectory; or (ii) causes the mobile platform to perform a maneuver (e.g., brake, accelerate, or swerve).

Figure 3:
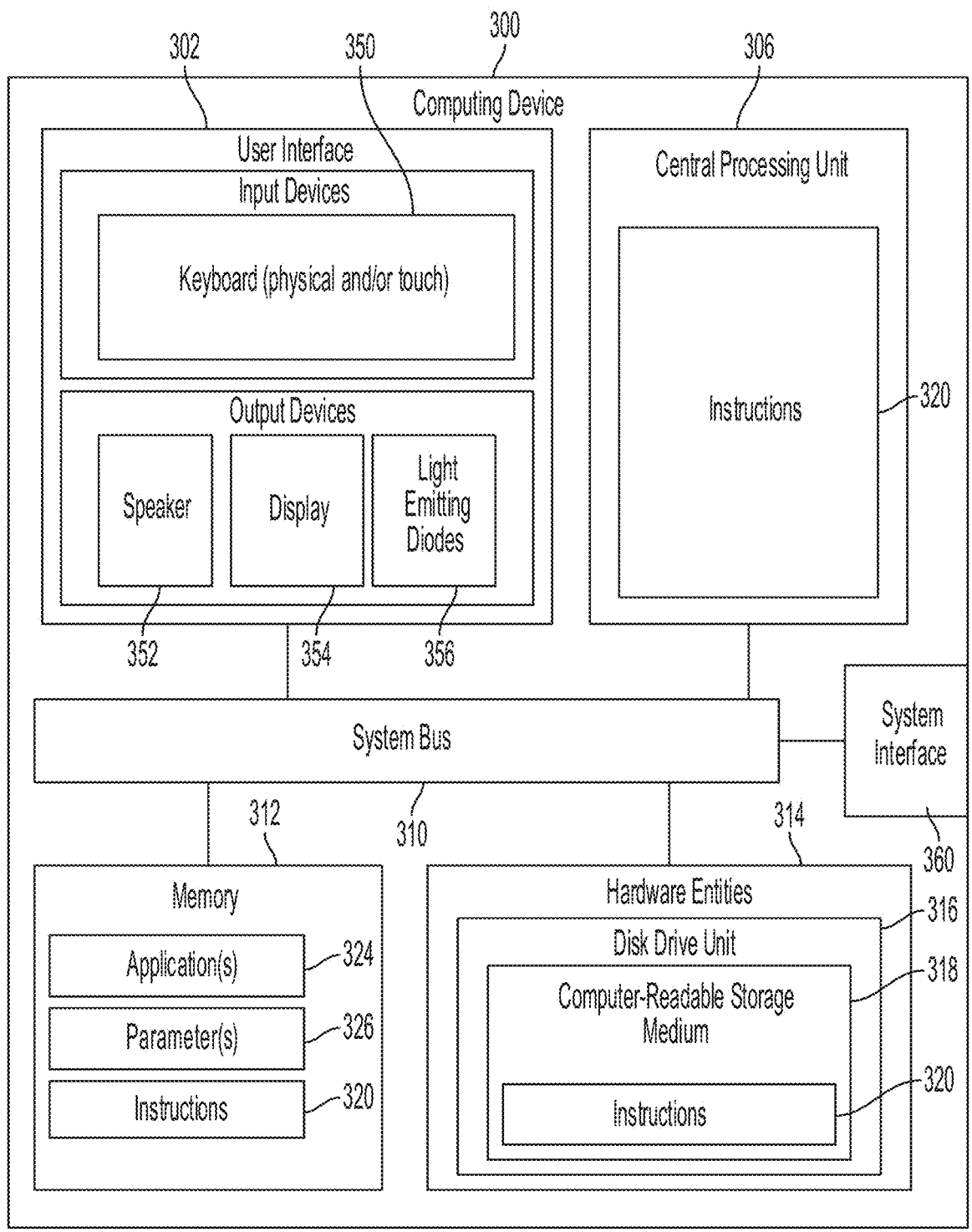
FIG. 3 is an illustration of a computing device.

Referring now to FIG. 3, there is provided an illustration of an illustrative architecture for a computing device 300. The computing device 110 of FIG. 1 and/or the on-board computing device 220 of FIG. 2 is/are the same as or similar to computing device 300. As such, the discussion of computing device 300 is sufficient for understanding the computing device 110 of FIG. 1 and the on-board computing device 220 of FIG. 2.

Computing device 300 may include more or less components than those shown in FIG. 3. However, the components shown are sufficient to disclose an illustrative solution implementing the present solution. The hardware architecture of FIG. 3 represents one implementation of a representative computing device configured to operate a mobile platform, as described herein. As such, the computing device 300 of FIG. 3 implements at least a portion of the method(s) described herein.

Some or all components of the computing device 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the computing device 300 comprises a user interface 302, a Central Processing Unit (CPU) 306, a system bus 310, a memory 312 connected to and accessible by other portions of computing device 300 through system bus 310, a system interface 360, and hardware entities 314 connected to system bus 310. The user interface can include input devices and output devices, which facilitate user-software interactions for controlling operations of the computing device 300. The input devices include, but are not limited to, a physical and/or touch keyboard 350. The input devices can be connected to the computing device 300 via a wired or wireless connection (e.g., a Bluetooth® connection). The output devices include, but are not limited to, a speaker 352, a display 354, and/or light emitting diodes 356. System interface 360 is configured to facilitate wired or wireless communications to and from external devices (e.g., network nodes such as access points, etc.).

At least some of the hardware entities 314 perform actions involving access to and use of memory 312, which can be a Random Access Memory (RAM), a disk drive, flash memory, a Compact Disc Read Only Memory (CD-ROM) and/or another hardware device that is capable of storing instructions and data. Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the computing device 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the computing device 300 and that cause the computing device 300 to perform any one or more of the methodologies of the present disclosure.

Figure 4:
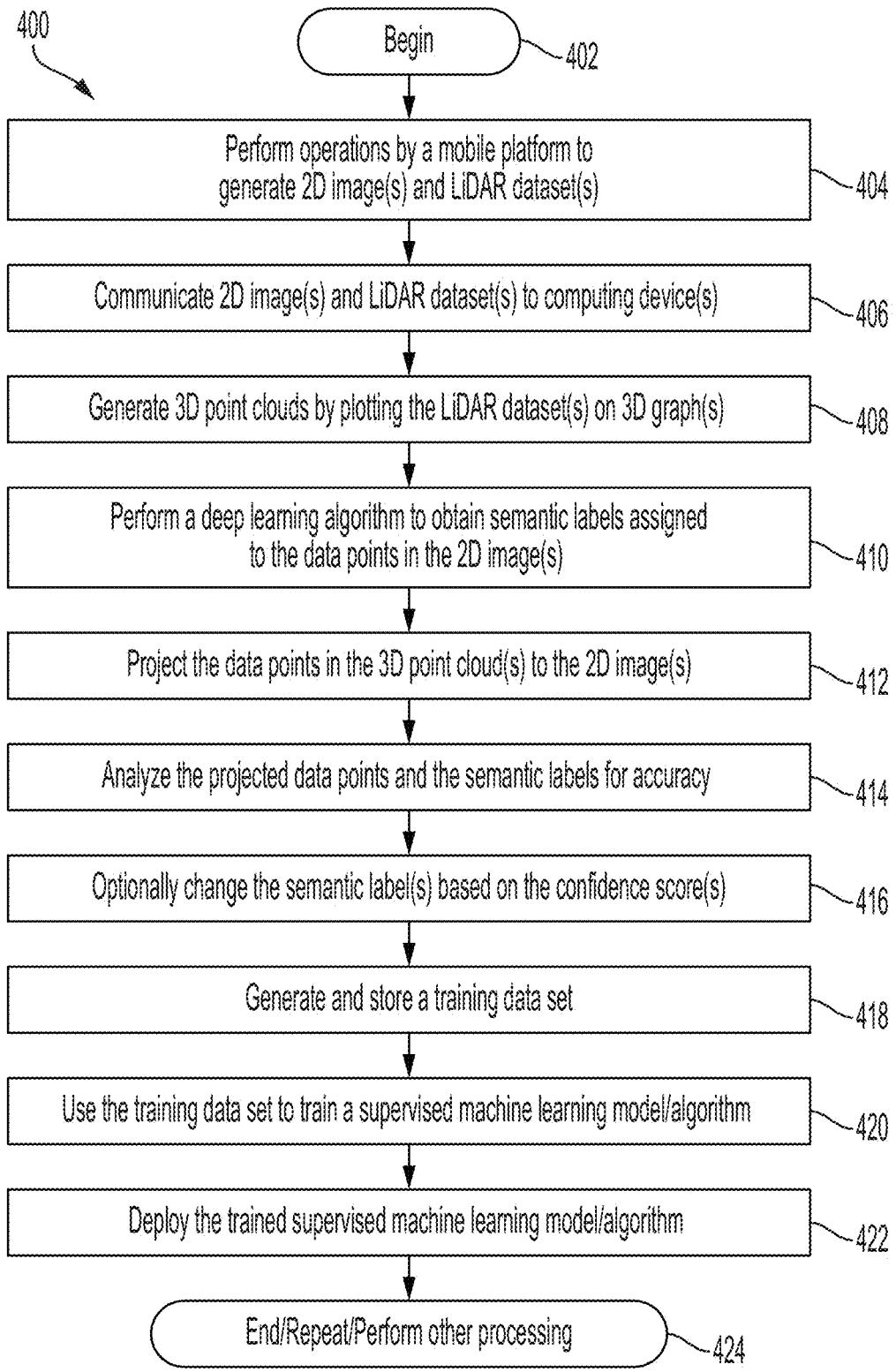
FIG. 4 provides a flow diagram of an illustrative method for training a supervised machine learning algorithm.

Referring now to FIG. 4, there is provided a flow diagram of an illustrative method 400 for training a supervised machine learning model or algorithm (e.g., machine learning model/algorithm 128 of FIG. 1). Method 400 can be implemented in mobile platform 120 of FIG. 1, computing device 110 of FIG. 1 and/or computing device 300 of FIG. 3.

Method 400 begins with 402 and continues with 404 where sensors (e.g., sensors 130 of FIG. 1) of a mobile platform (e.g., mobile platform 120 of FIG. 1) perform operations to generate 2D image(s) and LiDAR dataset(s). The 2D image(s) and/or LiDAR dataset(s) are communicated to computing device(s) (e.g., computing device 110 of FIG. 1, on-board computing device 220 of FIG. 2, and/or computing device 300 of FIG. 3) for processing and/or storage in a datastore (e.g., datastore 112 of FIG. 1), as shown by 406.

Figure 5:
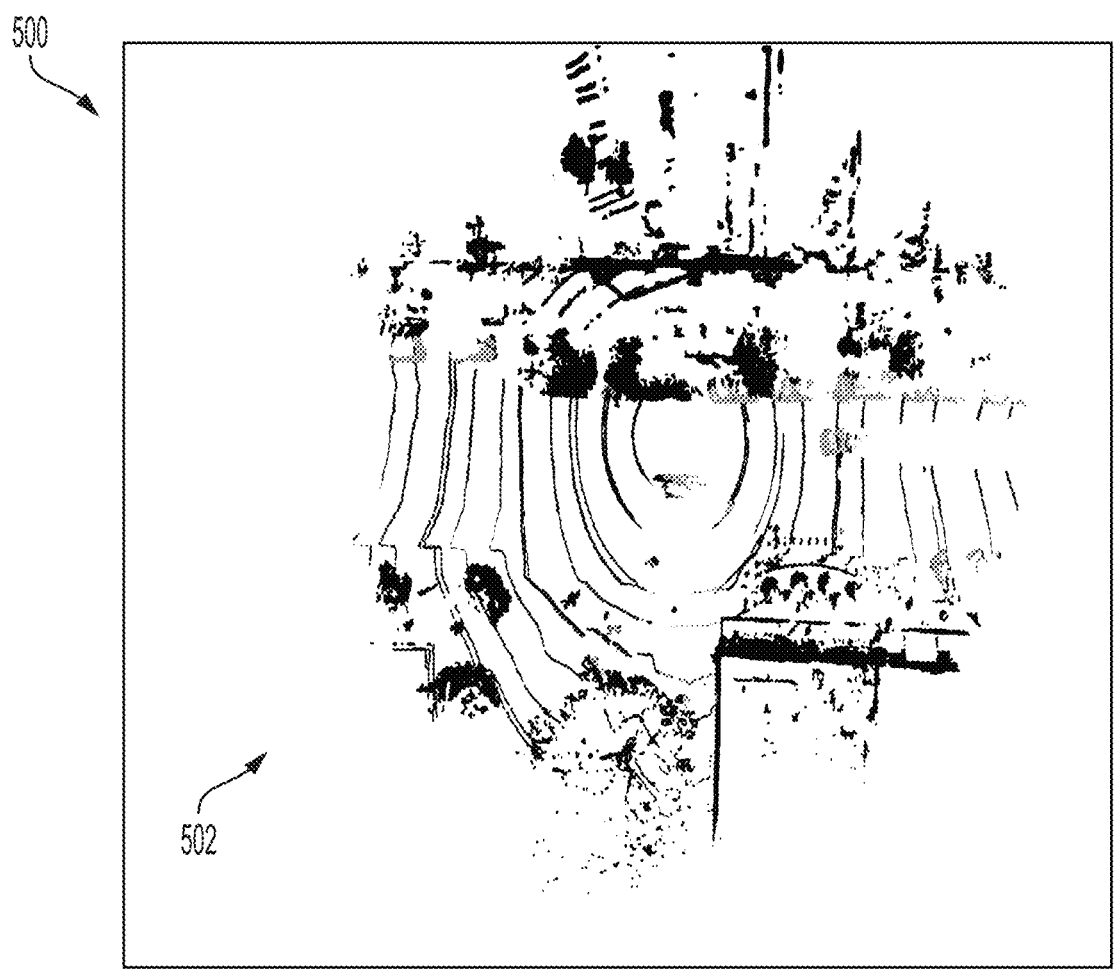
FIG. 5 provides a 3D graph with LiDAR data points plotted thereon.

In 408, the computing device generates 3D point clouds by plotting the LiDAR datasets on 3D graphs. Each 3D graph has an x-axis, a y-axis and a z-axis with an origin defined at a center of a LiDAR sensor, the x-axis pointing forward and the z-axis pointing upward. An illustration of a LiDAR dataset 502 plotted on a graph 500 is provided in FIG. 5. Notably, graph 500 only shows the 2D point of view from the x-axis and the z-axis for ease of illustration. Techniques for plotting LiDAR datasets on 3D graphs are well known.

Figure 6:
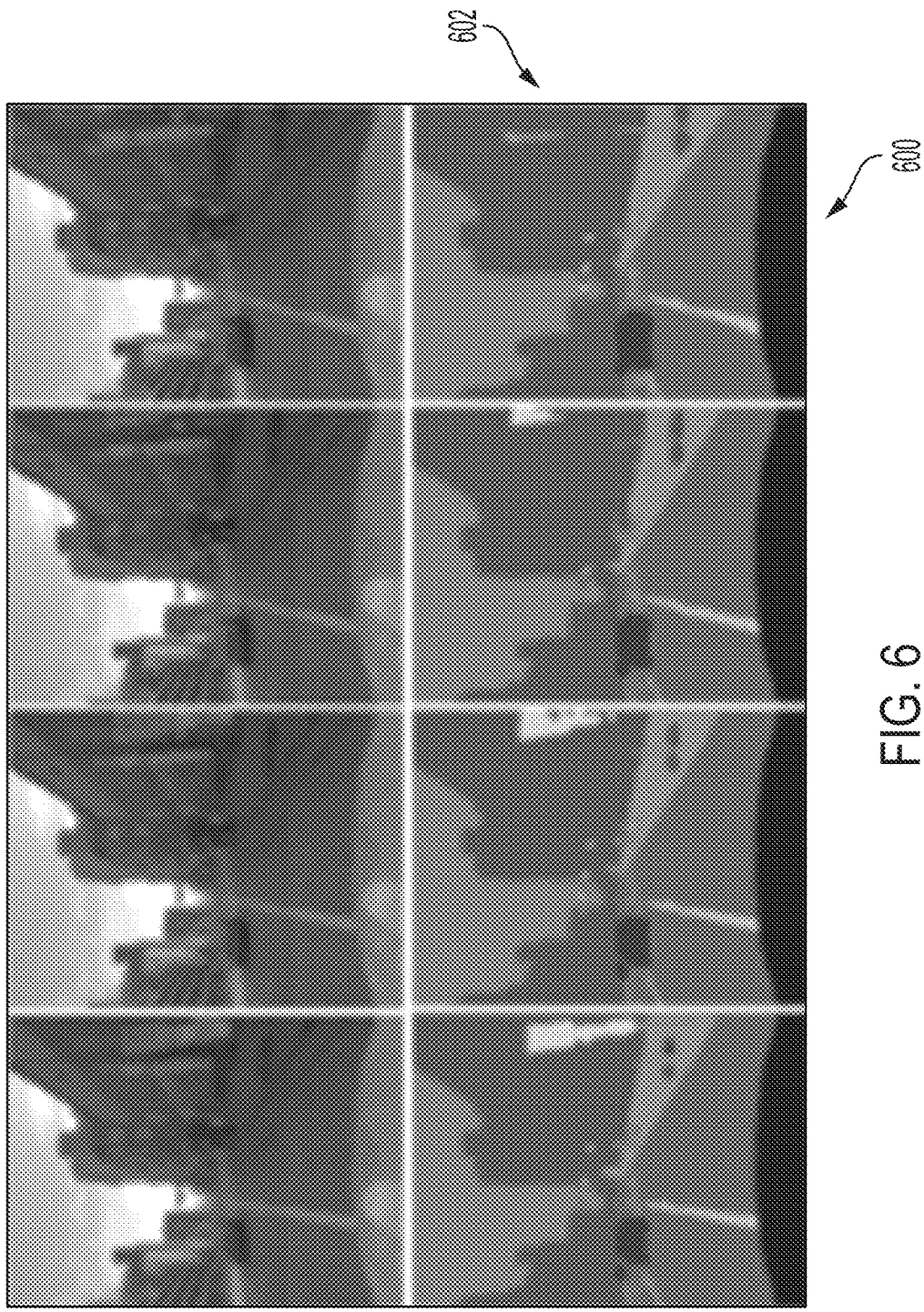
FIG. 6 provides images that are useful for understanding drawbacks of semantic label assignments by a deep learning model.

A deep learning algorithm (e.g., a CNN) is performed in 410 to obtain semantic labels for the data points (e.g., pixel values) in the 2D images. Semantic labels for data points (e.g., pixel values) are well known. The semantic labels can include, but are not limited to, no data, unlabeled, road, sidewalk, building, fence, vegetation, terrain, vehicle, person, animal, and/or sign. Each data point of the 2D image has a semantic label associated therewith. Techniques for semantic labeling of data points in 2D images are well known. Some of the semantic labels output from the deep learning model may be incorrect as shown in the images of FIG. 6. In FIG. 6, the bottom images represent outputs of the deep learning algorithm. The right most bottom image 600 shows that a sign 602 was not labeled by the deep learning algorithm.

Referring again to FIG. 4, method 400 continues with 412 where 3D projection is performed to project the data points of the 3D graph(s) to the 2D image(s). 3D projection techniques are well known and rely on visual perspective and aspect analysis to project a 3D object on a 2D plane. The semantic labels of the 2D pixel values are then transferred or propagated to the data points of the 3D graph(s) based on results of the 3D projection.

In 414, the projected data points and semantic labels are analyzed (e.g., manually) to determine whether the projected data points are correctly associated with the respective semantic labels. This analysis can involve: identifying features in the sensor data; and confirming that the semantic labels associated with the features are accurate. One or more semantic labels may be changed (e.g., manually) in 416 based on results of the analysis of 414.

The features can include, but are not limited to, edges, vertical lines, horizontal lines, bends curves, normal of points, relative locations of points in 3D space, distances between points in 3D space, angle of projected data point to a given surface, density of data points in proximity to a boundary of an object, a probability of a current class P(x), a ratio PKR of a second best class assignment of a neural network for each data point (e.g., sidewalk) divided by a first best class assignment of the neural network for each data point (e.g., building), a distance D from a data point to a projection plane, a measure of how fronto-parallel the captured surface is to the sensor, an angular distance value $D_{angular}$, and/or a conditional probability P(X|Boundary) that a data point is a specific class conditioned on the probability that a patch is or is not a boundary patch.

The ratio PKR can be defined by the following mathematical equation (1).

$$PKR = 1 - (P(x_2)/P(x_1)) \quad (1)$$

The distance D can be defined by the following mathematical equation (2).

$$D = 1/(1 + \exp(0.1 \cdot (d-60)) \quad (2)$$

where d represents the coordinates of a data point. In some scenarios, the logistic function mid-point is set to sixty meters. This value can be derived from intrinsic camera parameters. A fronto parallel surface of ten square centimeters is projected to a nine square pixel area. The parameters of the logistic function are set such that the confidence function of this feature is a half at sixty meters range from the projection plane. The function growth rate can be smoothed by a given resolution (e.g., 0.1) to better capture confidence as the data points move further away from the projection plane.

Objects further away from the projection plane appear smaller in the image frame which means that the related pixels encode large amounts of information in real world units. A square meter rectangle a mile away from the car can be collapsed to a single pixel. A feature based on the time offset of the captured LiDAR data point may be implemented as a logistic function with a midpoint of, for example, eighty milliseconds and a function growth rate at, for example a half. The cosine angular distance of a shooting ray compared to a normal on the LiDAR data point measures how fronto-parallel the captured surface is to the sensor. This cosine angular distance can be defined by mathematical equation (3).

$$\cos(\theta) = \vec{ray} \cdot \overrightarrow{normal} \quad (3)$$

Both vectors are unit vectors converted to the camera local coordinate system. The dot product is weighed by the normal confidence, as shown by mathematical equation (4).

$$D_{angular} = \max(0, \cos(\theta) \cdot D_{normal}) \quad (4)$$

where $D_{normal}$ represents a normal distance value.

Pictures tend to better capture fronto parallel surfaces to the camera projection frame. The more tilted a surface the less pixels it occupies. The system considers a half space of (pi/2, pi/2) radians as valid angles. If a normal has an angular distance with the camera shooting ray in the space [pi/2, 3pi/2] radians, the point is not visible in the current view and the label assignment confidence should be zero. The conditional probability of a data point assigned a specific class given the probabilities of a local neighborhood of adjacent data points can be simplified as the conditional probability P(X|Boundary) that a data point is a specific class conditioned on the probability that a patch is or is not a boundary patch. The conditional probability P(X|Boundary) can be defined by the following mathematical equation (5).

$$P(X|Boundary) = (P(Boundary|Class) \cdot P(X=Class))/P(Boundary) \quad (5)$$

Next in 418, a training data set (e.g., training data set 126 of FIG. 1) is generated and stored in a datastore (e.g., datastore 112 of FIG. 1 and/or memory 312 of FIG. 3). The training data set comprises a plurality of training examples $(x_0, y_0), (x_1, y_1), \ldots, (x_n, y_n)$ for training a supervised machine learning model/algorithm $f_\theta(x)$, where each component $x_0, x_1, \ldots, x_n$ represents sensor data (e.g., LiDAR data) comprising a collection of labeled data points $d_1, d_2, \ldots, d_r$ (e.g., 3D data points $p_1, p_2, \ldots, p_r$ with assigned semantic labels $l_1, l_2, \ldots, l_r$) and each component $y_0, y_1, \ldots, y_n$ represents a label or ground truth for each labeled data point. The training data set may be created using LiDAR dataset(s) and/or other sensor data generated by one or more sensor(s) (e.g., sensors 130 of FIG. 1) on the mobile platform (e.g., mobile platform 120 of FIG. 1). The labels or ground truth values $y_i$ may have been manually defined by a user (e.g., user 122 of FIG. 1) of the computing device for each data point in each collection $x_i$ of the training examples.

In 420, the training data set is used to train a supervised machine learning model/algorithm (e.g., a random forest classifier) to generate a confidence value representing a level of confidence that the semantic label assigned to each data point in sensor data is accurate and/or correct. For example, a confidence value of 1 is generated when the semantic label is accurate/correct with the highest degree of confidence (e.g., 100% confident), and a confidence value of 0 is generated when the semantic label is accurate/correct with the lowest degree of confidence (e.g., 0% confident). Techniques for training supervised machine learning model(s)/algorithm(s) using trained data set(s) are well known. The trained supervised machine learning model/algorithm is deployed in 422, for example, to another mobile platform (e.g., mobile platform $102_1$ of FIG. 1). Subsequently, 424 is performed where method 400 ends, some or all of the operations of method 400 are repeated, or method 400 continues with other operations.

Figure 7:
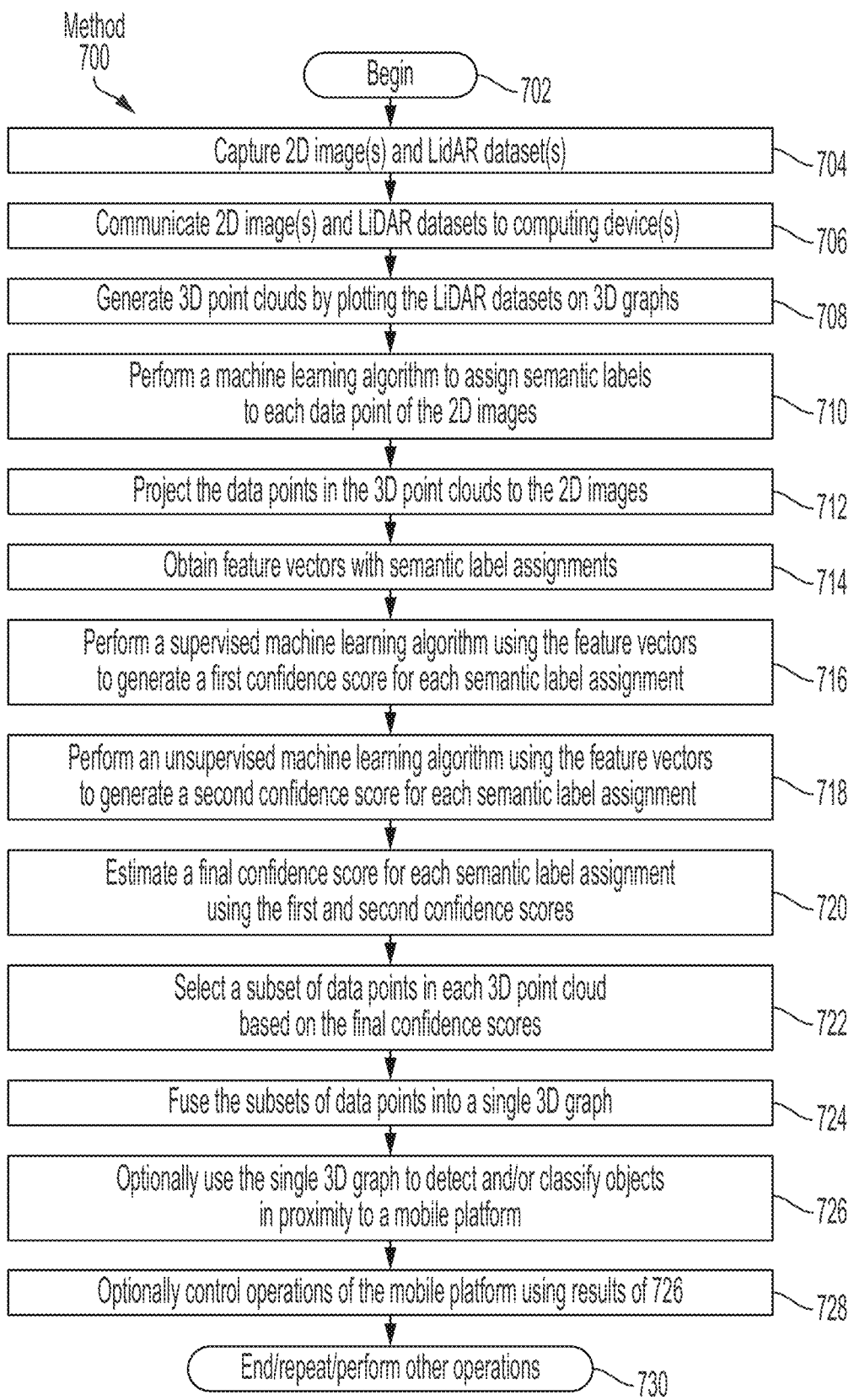
FIG. 7 provides a flow diagram of an illustrative method for processing and/or using sensor data.

Referring now to FIG. 7, there is provided a flow diagram of an illustrative method 700 for processing and/or using sensor data. Method 700 begins with 702 and continues with 704 where sensor(s) (e.g., camera 262 and/or LiDAR system 264 of FIG. 2) of a mobile platform (e.g., mobile platform $102_1$ of FIG. 1) perform(s) operations to capture sensor data. The sensor data can include, but is not limited to, 2D image(s) and/or LiDAR dataset(s). The sensor data is communicated from the sensor(s) to computing device(s) (e.g., computing device 110 of FIG. 1 and/or on-board computing device 220 of FIG. 2).

In 708-710, the computing device(s) generate(s) 3D point clouds by plotting the LiDAR datasets on 3D graphs and performing machine learning algorithm(s) to assign semantic labels to each data point of the 2D images. The machine learning algorithm(s) can include, but are not limited to, neural network(s). Methods for assigning semantic labels to data points in 2D images are well known.

The data points of the 3D graphs are then projected to the 2D images in accordance with a 3D projection technique, as shown by 712. 3D projection techniques are well known and rely on visual perspective and aspect analysis to project a 3D object on a 2D plane. The semantic labels of the 2D pixel values are then transferred or propagated to the data points of the 3D graph(s) based on results of the 3D projection. The semantic labels can include, but are not limited to, no data, unlabeled, road, sidewalk, building, fence, vegetation, terrain, vehicle, person, animal, and/or sign.

In 714, the labelled 3D data points are analyzed to obtain feature vectors $F_i$ with semantic label assignments. i is an integer. Feature vectors are well known, and methods for generating the same are well known. Each feature vector $F_i$ comprises an n-dimensional vector of numbers defining features that represent some object (e.g., a vehicle, a person, a building, a tree, a sign, sidewalk, etc.). The features can include, but are not limited to, edges, vertical lines, horizontal lines, bends curves, normal of points, relative locations of points in 3D space, distances between points in 3D space, angle of projected data point to a given surface, density of data points in proximity to a boundary of an object, a probability of a current class P(x), a ratio PKR of a second best class assignment of a neural network for each data point (e.g., sidewalk) divided by a first best class assignment of the neural network for each data point (e.g., building), a distance D from a data point to a projection plane, a measure of how fronto-parallel the captured surface is to the sensor, an angular confidence value $C_{angular}$, and/or a conditional probability P(X|Boundary) that a data point is a specific class conditioned on the probability that a patch is or is not a boundary patch.

Figure 8:
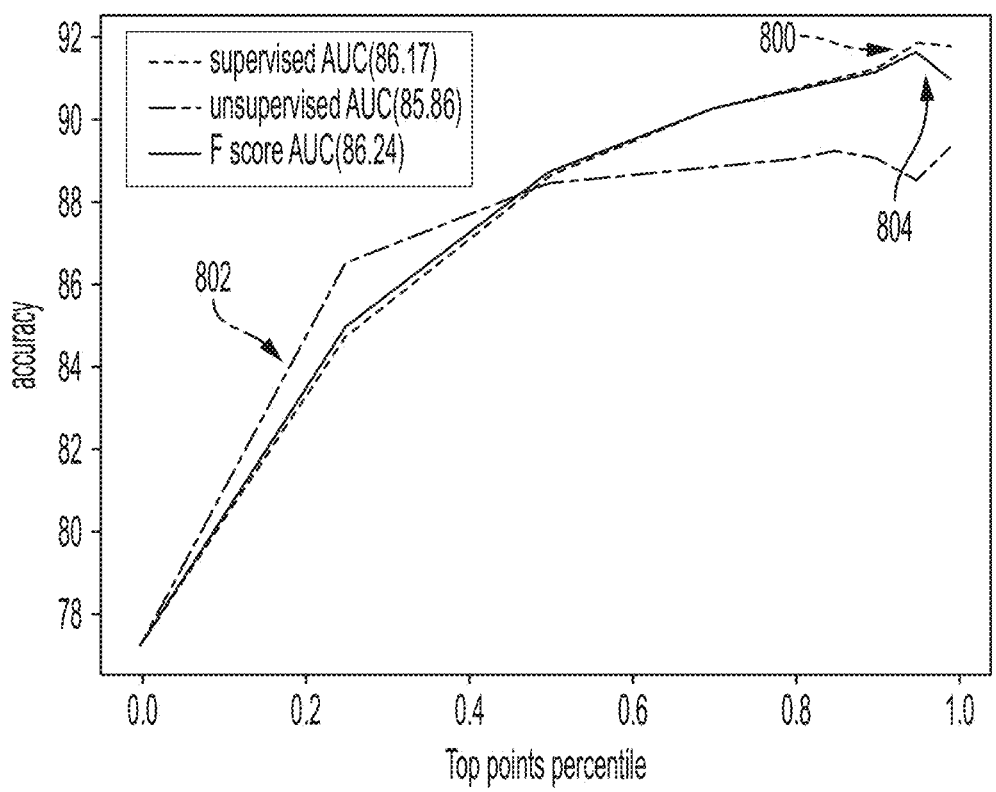
FIG. 8 provides a graph that is useful for understanding confidence scores.

In 716, the feature vectors $F_i$ are input into a supervised machine learning model/algorithm. The supervised machine learning model/algorithm can include, but is not limited to, a random forest classifier. The random forest classifier generally creates decision trees based on the input feature vectors $F_i$, obtains a semantic label prediction from each decision tree for each data point, and selects the best semantic label predictions for each data point by means of voting. The supervised machine learning algorithm is trained in accordance with method 400 discussed above. The supervised machine learning algorithm is trained to generate a first confidence score $S_1$ for each data point in the 3D point cloud(s) based on the semantic label assigned thereto and the respective best semantic label prediction. A high confidence score (e.g., 1) is assigned when the assigned semantic label is correct for a given data point of the 3D point cloud(s) (i.e., the assigned semantic label matches the respective best semantic label prediction), and a low confidence score (e.g., 0) is assigned when the assigned semantic label is incorrect for a given data point of the 3D point cloud(s) (i.e., the assigned semantic label does not match the respective best semantic label prediction). FIG. 8 shows a line 800 illustrating first confidence scores plotted on a graph.

In 718, the feature vectors $F_i$ are input into an unsupervised machine learning model/algorithm. The unsupervised machine learning algorithm is generally configured to generate a second confidence score $S_2$ for each pair of data points in the 3D point cloud(s) and semantic label. The unsupervised machine learning model/algorithm can include, but is not limited to, a Principal Component Analysis (PCA) model/algorithm. The PCA model/algorithm is configured to calculate a projection of the feature vector data into a single dimension. This computation is achieved by: calculating the mean value M of each column in a feature vector $F_i$ (i.e., M=mean($F_i$)); generate a centered matrix C by subtracting the mean values from the values of the feature vector (i.e., C=$F_i$−M); calculate a covariance matrix V of the centered matrix (i.e., V=$_{cov}$(C)); and calculate the eigendecomposition of the covariance matrix to obtain eigenvalues and eigenvectors (i.e., values, vectors=eig(V)). The second confidence scores are computed by projecting the feature vector of each data point to the eigenvector with the largest eigenvalue. FIG. 8 shows a line 802 illustrating second confidence scores plotted on a graph.

In 720, the first and second confidence scores are used to estimate a final confidence score $S_{final}$ for each semantic label assignment. The final confidence score $S_{final}$ can comprise an $F_{score}$ of the first confidence score $S_1$ and the second confidence score $S_2$. The $F_{score}$ can be computed in accordance with mathematical equation (8).

$$F_{score} = 2 \cdot (S_1 \cdot S_2)/(S_1 + S_2) \quad (8)$$

FIG. 8 shows a line 804 illustrating final confidence scores plotted on a graph.

In 722, a subset of the data points in each 3D point cloud are selected based on the final confidence scores. The selected data points may comprise those data points with the W highest confidence scores (where W is an integer) or those data points with an F-score equal to or greater than a pre-defined threshold value. The subsets of data points are then fused or aggregated into a single 3D graph, as shown by 724. The single 3D graph represents a dense 3D representation of a scene over multiple LiDAR sweeps.

The final confidence scores $S_{final}$ may be used in 724 to selectively modify one or more semantic labels to optimize the global label assignments when the data points are fused or aggregated. For example, a first data point that is labeled as a building and resides amongst second data points labeled as sidewalk will have its label modified if (i) the aggregate final confidence score with original semantic labeling is less than (ii) the aggregate final confidence score with the changed semantic labeling. A well-known Markov Random Field (MRF) equation can be used to determine whether (i) less than (ii). A 3D graph output from a conventional system without global semantic label assignment optimization is shown in FIG. 9. A 3D graph output from the present solution with global semantic label assignment optimization is shown in FIG. 10.

The single 3D graph can optionally be used for various purposes. For example, the 3D graph produced in 724 can be used to detect and/or classify objects (e.g., vehicle $102_2$ of FIG. 1) in proximity to a mobile platform (e.g., vehicle $102_1$ of FIG. 1, an articulating arm or other robotic system). Results of the object detection/classification may then be used to control operations of the mobile platform as shown by 728. Subsequently, 730 is performed where method 700 ends, at least a portion of method 700 is repeated, and/or method 700 continues with other operations.

In some scenarios, the object detection can be made automatically/automatedly by the computing device(s) employing any known or to be known algorithm to identify data points that appear to define an object. Machine learning algorithms can be used here to facilitate the object detection(s) and/or classification(s). For each detected object, a cuboid may be defined on the 3D graph. The cuboid comprises a 3D oriented bounded box that represents (i) a heading of the object (e.g., object $102_2$ of FIG. 1), (ii) the full extent of the object, and/or the center/centroid of the object.

In this regard, the cuboid encompasses the LiDAR data points in the 3D graph that are associated with the detected object. The computing device may obtain pre-defined cuboid dimensions (a length, a width, a height) and set a center of a cuboid equal to a center of the LiDAR data points of the detected object. The cuboid can comprise a 3D shape that (i) encompasses a given percentage (e.g., >90%) of the LiDAR data points of the detected object and (ii) none or a minimal number of the LiDAR data points for other detected objects (but allowing for the inclusion of LiDAR data points for ground surface). The cuboid is then used to control operations of the mobile platform. The 3D graph and cuboid(s) may then be used to facilitate driving-related operations of the mobile platform (e.g., object detection, object tracking, object trajectory prediction, and/or platform trajectory determination). The present solution is not limited to the particulars of these scenarios.

Figure 11:
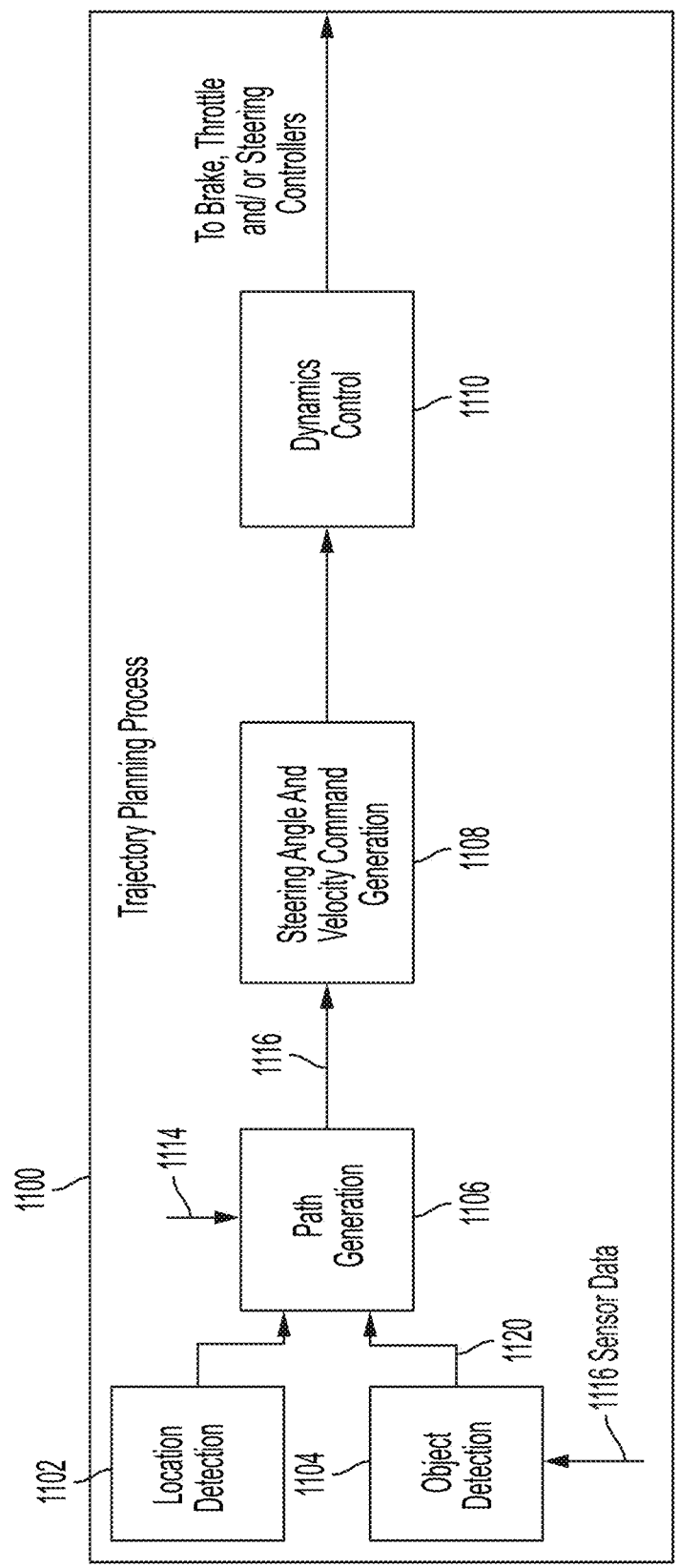
FIG. 11 provides a block diagram of an illustrative mobile platform trajectory planning process.

Referring now to FIG. 11, there is provided a block diagram that is useful for understanding how movement of a mobile platform (e.g., an AV) is achieved in accordance with the present solution. All of the operations performed in blocks 1102-1110 can be performed by the on-board computing device of the mobile platform (e.g., AV $102_1$ of FIG. 1).

In block 1102, a location of the mobile platform (e.g., AV $102_1$ of FIG. 1) is detected. This detection can be made based on sensor data output from a location sensor (e.g., location sensor 260 of FIG. 2) of the mobile platform. This sensor data can include, but is not limited to, GPS data. The detected location of the mobile platform is then passed to block 1106.

In block 1104, an object (e.g., vehicle $102_2$ of FIG. 1) is detected within proximity of the mobile platform (e.g., <100+ meters). This detection is made based on sensor data output from a camera (e.g., camera 262 of FIG. 2) of the mobile platform or another mobile platform, and/or a LiDAR system (e.g., LiDAR system 264 of FIG. 2) of the mobile platform or another mobile platform. For example, image processing is performed to detect an instance of an object of a certain class (e.g., a vehicle or pedestrian) in one or more images. LiDAR datasets are also processed to detect instances of objects of certain classes represented by point cloud data. Such sensor data processing can be achieved using machine learning algorithms that are trained to detect patterns in images and/or LiDAR datasets which identify objects of a given classes (e.g., a vehicle or pedestrian). Any machine learning algorithm can be used here. For example, one or more of the following machine learning algorithms is employed here: supervised learning; unsupervised learning; semi-supervised learning; and reinforcement learning.

Additionally, a predicted trajectory is determined in block 1104 for the object. The object's trajectory is predicted in block 1104 based on results of the machine learning algorithms (e.g., an object class), a cuboid geometry, and/or a track (defined by cuboids over time), and/or contents of a map (e.g., a road/terrain map including information specifying sidewalk locations, lane locations, lane directions of travel, driving rules, etc.).

The cuboid geometry is determined using the LiDAR dataset, images and/or the map. Techniques for predicting object trajectories based on cuboid geometries are well known in the art. Any known or to be known technique for predicting object trajectories based on cuboid geometries can be used herein without limitation. For example, one technique involves predicting that the object is moving on a linear path in the same direction as the heading direction of the cuboid. The predicted object trajectories can include, but are not limited to, the following trajectories:

a trajectory defined by the object's actual speed (e.g., 1 mile per hour) and actual direction of travel (e.g., west);

a trajectory defined by the object's actual speed (e.g., 1 mile per hour) and another possible direction of travel (e.g., south, south-west, or X (e.g.,)40° degrees from the object's actual direction of travel in a direction towards the AV) for the object;

a trajectory defined by another possible speed for the object (e.g., 2-10 miles per hour) and the object's actual direction of travel (e.g., west); and/or a trajectory defined by another possible speed for the object (e.g., 2-10 miles per hour) and another possible direction of travel (e.g., south, south-west, or X (e.g.,) 40° degrees from the object's actual direction of travel in a direction towards the AV) for the object.

The possible speed(s) and/or possible direction(s) of travel may be pre-defined for objects in the same class and/or sub-class as the object. It should be noted once again that the cuboid defines a full extent of the object and a heading of the object. The heading defines a direction in which the object's front is pointed, and therefore provides an indication as to the actual and/or possible direction of travel for the object.

Information 1120 specifying the object's predicted trajectory and the cuboid geometry is provided to block 1106. In some scenarios, a classification of the object is also passed to block 1106. In block 1106, a platform trajectory is generated using the information from blocks 1102 and 1104. Techniques for determining a platform trajectory using a cuboid are well known in the art. Any known or to be known technique for determining a platform trajectory using a cuboid can be used herein without limitation. For example, in some scenarios, such a technique involves determining a trajectory for the mobile platform that would pass the object when the object is in front of the mobile platform, the cuboid has a heading direction that is aligned with the direction in which the mobile platform is moving, and the cuboid has a length that is greater than a threshold value. The present solution is not limited to the particulars of this scenario. The platform trajectory 1116 can be determined based on the location information from block 1102, the object detection information from block 1104, and/or map information 1114 (which is pre-stored in a data store of the mobile platform). The platform trajectory 1116 may represent a smooth path that does not have abrupt changes that would otherwise provide passenger discomfort. For example, the platform trajectory is defined by a path of travel along a given lane of a road in which the object is not predicted to travel within a given amount of time. The platform trajectory 1116 is then provided to block 1108.

In block 1108, a steering angle and velocity command is generated based on the platform trajectory 1116. The steering angle and velocity command is provided to block 510 for dynamics control, i.e., the steering angle and velocity command causes the mobile platform to follow the platform trajectory 1116.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for processing and using sensor data, comprising:
   obtaining, by the computing device, semantic labels assigned to data points of the sensor data;
   performing, by the computing device, a supervised machine learning algorithm and an unsupervised machine learning algorithm to respectively generate a first confidence score and a second confidence score for each semantic label of said semantic labels, each of the first and second confidence scores representing a degree of confidence that the semantic label is correctly assigned to a respective one of the data points;
   generating, by the computing device, a final confidence score for each said semantic label based on the first and second confidence scores;
   selecting, by the computing device, subsets of the data points based on the final confidence scores; and
   aggregating, by the computing device, the data points of the subsets to produce an aggregate set of data points.

2. The method according to claim 1, further comprising using the aggregated data set in an object detection process to detect an object in proximity of a robotic system.

3. The method according to claim 1, further comprising using results of the object detection process to control operations of the robotic system.

4. The method according to claim 1, further comprising:
   assigning semantic labels to each data point in a plurality of 2D images; and
   propagating the semantic labels to the data points which are in a plurality of LiDAR point clouds.

5. The method according to claim 1, wherein the first and second confidence scores are determined using at least one of the following features: normal of data points; relative locations of data points in 3D space; distances between data points in 3D space; an angle of a data point projected onto a 2D image relative to a given surface captured in the 2D image; a density of data points in proximity to a boundary of an object; a probability of a current semantic label assignment for each data point, a ratio of a second best semantic label assignment of a neural network for each data point to a first best semantic label assignment of the neural network for each data point; a distance from a data point to a projection plane; a measure of how fronto-parallel a captured surface is to a sensor; an angular confidence value; and a conditional probability that a data point should be assigned a specific semantic label conditioned on a probability that a patch of data points to which the data point belongs is or is not a boundary patch.

6. The method according to claim 1, wherein the supervised machine learning algorithm comprises a random forest classifier configured to determine a best semantic label prediction for each said data point and use the best semantic label prediction to generate the first confidence score for the semantic label assigned to said data point.

7. The method according to claim 5, wherein the first confidence score has a high confidence value when the semantic label assigned to said data point matches the best semantic label prediction, and a low confidence value when the semantic label assigned to said data point does not match the best semantic label prediction.

8. The method according to claim 1, wherein the unsupervised machine learning algorithm (i) performs a principal component analysis to obtain eigenvectors with eigenvalues for each said data point, and (ii) computes the second confidence value by projecting a feature vector of each said data point to one of the eigenvectors with a largest one of the eigenvalues.

9. The method according to claim 1, wherein the final confidence score comprises an F-score of the first and second confidence values.

10. The method according to claim 1, wherein the subsets comprise said data points with said F-score equal to or greater than a pre-defined threshold value, and the final confidence score is closer to the second confidence score when a top point percentile is below a threshold, and is closer to the first confidence score when the top point percentile is above the threshold.

11. The method according to claim 1, further comprising modifying at least one of said semantic labels based on the final confidence scores to optimize global semantic label assignments within the aggregate set of data points.

12. A system, comprising:
   a processor;
   a non-transitory computer-readable storage medium comprising programming instructions that are configured to cause the processor to implement a method for processing and using sensor data, wherein the programming instructions comprise instructions to:
   obtain semantic labels assigned to data points of the sensor data;
   perform a supervised machine learning algorithm and an unsupervised machine learning algorithm to respectively generate a first confidence score and a second confidence score for each semantic label of said semantic labels, each of the first and second confidence scores representing a degree of confidence that the semantic label is correctly assigned to a respective one of the data points;
   generate a final confidence score for each said semantic label based on the first and second confidence scores;
   select subsets of the data points based on the final confidence scores; and
   aggregate the data points of the subsets to produce an aggregate set of data points.

13. The system according to claim 12, wherein the programming instructions further comprise instructions to use the aggregated data set in an object detection process to detect an object in proximity of a robotic system, and to use results of the object detection process to control operations of the robotic system.

14. The system according to claim 12, wherein the programming instructions further comprise instructions to:
   assign semantic labels to each data point in a plurality of 2D images; and
   propagate the semantic labels to the data points which are in a plurality of LiDAR point clouds.

15. The system according to claim 12, wherein the first and second confidence scores are generated using at least one of the following features: normal of data points;
   relative locations of data points in 3D space; distances between data points in 3D space; an angle of a data point projected onto a 2D image relative to a given surface captured in the 2D image; a density of data points in proximity to a boundary of an object; a probability of a current semantic label assignment for each data point, a ratio of a second best semantic label assignment of a neural network for each data point to a first best semantic label assignment of the neural network for each data point; a distance from a data point to a projection plane; a measure of how fronto-parallel a captured surface is to a sensor; an angular confidence value; and a conditional probability that a data point should be assigned a specific semantic label conditioned on a probability that a patch of data points to which the data point belongs is or is not a boundary patch.

16. The system according to claim 12, wherein the supervised machine learning algorithm comprises a random forest classifier configured to determine a best semantic label prediction for each said data point and use the best semantic label prediction to generate the first confidence score for the semantic label assigned to said data point.

17. The system according to claim 16, wherein the first confidence score has a high confidence value when the semantic label assigned to said data point matches the best semantic label prediction, and a low confidence value when the semantic label assigned to said data point does not match the best semantic label prediction.

18. The system according to claim 12, wherein the unsupervised machine learning algorithm (i) performs a principal component analysis to obtain eigenvectors with eigenvalues for each said data point, and (ii) computes the second confidence value by projecting a feature vector of each said data point to one of the eigenvectors with a largest one of the eigenvalues.

19. The system according to claim 12, wherein the final confidence score is calculated using the following equation:

$$F=2 \cdot (S_1 \cdot S_2)/(S_1+S_2)$$

where F represents the final confidence, $S_1$ represents the first confidence scores, and $S_2$ represents the second confidence scores.

20. A computer program product comprising a memory and programming instructions that are configured to cause a processor to:

obtain semantic labels assigned to data points of the sensor data;

perform a supervised machine learning algorithm and an unsupervised machine learning algorithm to respectively generate a first confidence score and a second confidence score for each semantic label of said semantic labels, each of the first and second confidence scores representing a degree of confidence that the semantic label is correctly assigned to a respective one of the data points;

generate a final confidence score for each said semantic label based on the first and second confidence scores;

select subsets of the data points based on the final confidence scores; and aggregate the data points of the subsets to produce an aggregate set of data points.

* * * * *